July 24, 1928.
L. GOLDHAMMER
1,678,430
SPOOL HOLDER FOR FILM CAMERAS
Filed Sept. 16, 1926
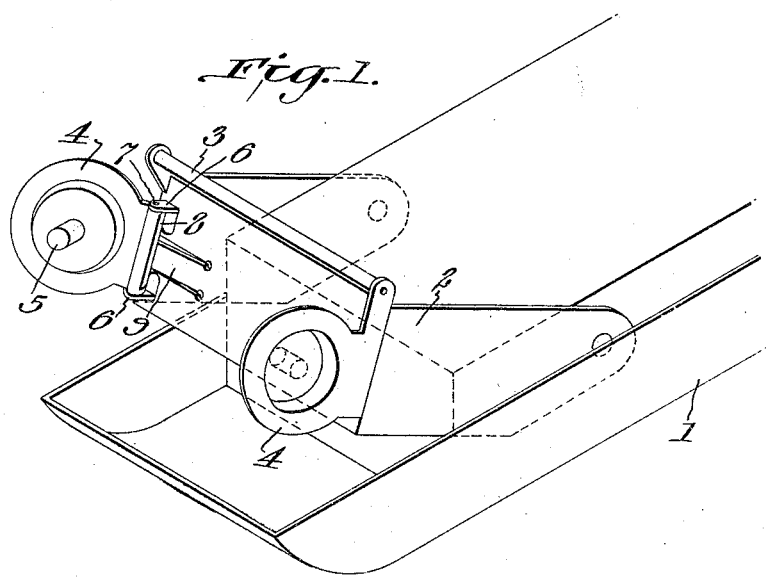
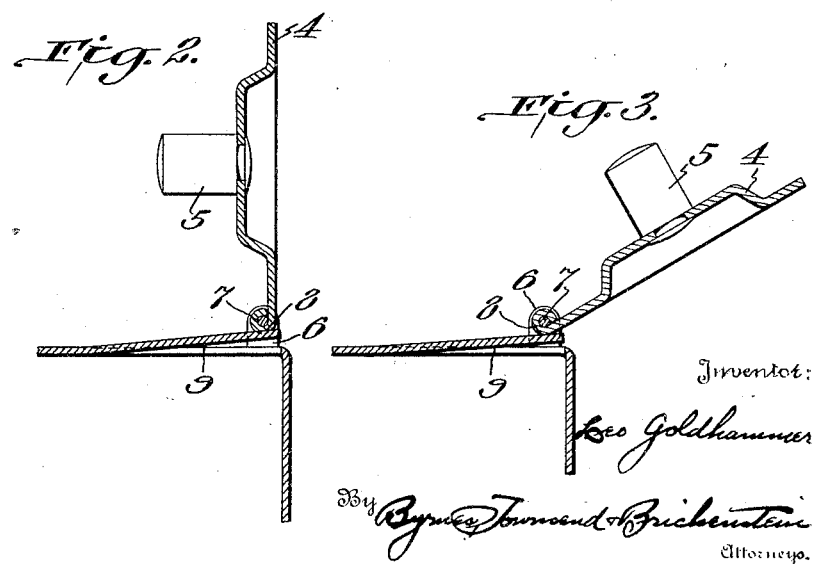

UNITED STATES PATENT OFFICE.

LEO GOLDHAMMER, OF MUNICH, GERMANY, ASSIGNOR TO HCH. RIETZSCHEL G. M. B. H., OF MUNICH, GERMANY.

SPOOL HOLDER FOR FILM CAMERAS.

Application filed September 16, 1926, Serial No. 135,919, and in Germany December 11, 1925.

This invention relates to photographic film cameras and roll holders and it has for an object to provide an efficient and simple support for the film spools, one which is cheap to build, yet durable in use.

Another object is to provide a spool support wherein the stub shafts for the spool are maintained in axial alignment and friction on the spool is reduced to a minimum.

A further object is to provide a spool holder which may be moved to a readily accessible position for the insertion or removal of spools, and whereby a continuous pressure on spring-pressed arms to release a spool is avoided.

These and other objects will be apparent from the following description taken in connection with the accompanying drawing wherein:

Fig. 1 is a view of the complete spool carrying frame.

Figs. 2 and 3 are side views on an enlarged scale of one end of the frame.

Referring to the drawing, numeral 1 designates the movable back of the camera, upon the side walls of which is pivoted the spool-carrier frame 2, comprising two parallel side arms and a connecting bridge piece, the arms and bridge piece being conveniently formed from one piece of metal by bending, though the construction is not so limited. Upon one edge of the bridge of frame 2 is the usual film guide roller 3.

Mounted at opposite ends of the bridge are the end plates 4, carrying stub shafts 5 for the film spools. One of these end plates is rigidly mounted on the bridge, the other being pivoted thereon about lugs 6 struck out from the metal of the bridge. The base of this pivoted plate 4 is bent around a pivot pin 7 which is mounted in the lugs 6.

Part of the metal of the plate 4 which is bent around pin 6 is cut or ground away to leave a flat surface 8 thereon. Co-operating with the surface 8 is flat spring 9, preferably stamped out from the bridge, as clearly seen in Fig. 1.

The operation will be clear from the drawing. In order to insert or remove a film spool, the frame 2 is pulled about its pivots to the position shown in Fig. 1. The pivoted end plate 4 is retained in an upright position, as seen in Fig. 2, and in engagement with the spool, if one is in place. Spring 9 co-operates with the flat 8 to yieldingly support the plate 4 in position. Due to the construction of this spring and plate, there is no binding between the plate and spool and therefore very slight friction because the end plate is not pressed beyond its vertical position. The pivoted plate may be easily moved about its pivotal mounting to the position shown in Fig. 3. As soon as flat 8 passes out of engagement with spring 9, the spring then exerts no force tending to move the pivoted plate and the latter will remain in the position shown in Fig. 3. A mere flip of the finger returns the plate to engaged position.

The walls of the camera casing act to hold the pivoted end plate in its spool-holding position when the bridge is within the camera in its normal position.

By this construction, one may pivot the end plate back out of the film spool and need not continually hold it there, thus greatly facilitating the loading and unloading of films.

Also, since the pivoted spool is held yieldingly in a vertical position, its stub shaft is maintained in axial alignment with the co-operating shaft on the other end plate, whereby undue friction and binding are prevented.

I do not wish to be limited to the details of the embodiment shown except as defined in the following claims.

I claim:

1. In a film camera, a spool support including a pivoted bridge, end plates on the bridge for holding the spool, one of said end plates being pivotally mounted thereon, said pivoted plate having a strap member bent about the pivotal axis as a center, a flat surface on said strap member and a spring pressed into engagement with said flat surface, whereby the pivoted end plate is yieldingly held at right angles to the bridge.

2. In a film camera, a sheet-metal bridge piece, perforated lugs thereon, an end plate for a film spool, a pivot pin for said end plate mounted on said lugs, said end plate having an integral strap bent about said pivot pin, a flattened portion on said strap, and a spring on said bridge piece co-operating with flattened portion to maintain the end piece yieldingly in an upright position.

3. In a film camera of the type in which a spool support is pivotally mounted on the case for movement into position outside of said case, a spool support comprising a bridge-shape member having end plates for pivotally supporting the opposite ends of a film spool, one of said plates being pivotally mounted on said support, and spring means operative only when said pivoted end plate is in approximately normal spool-holding position for yieldingly retaining said pivoted end plate in said normal position.

4. The invention as set forth in claim 3, in combination with means operative when the said spool support is moved into normal position within the camera case for preventing pivotal movement of said pivoted end plate.

5. In a film camera, the combination with a pivoted sheet metal bridge-shaped spool support comprising two end plates having stub shafts for receiving a film spool, one of said end plates being pivotally mounted on said spool support, the said pivoted plate having a strap member bent about its pivoted axis, said strap member having a flat surface, perforated lugs on said bridge piece for the pivotal mounting of said pivoted end plate, of a spring pressed into engagement with the said flat surface of the pivoted end plate to thereby hold said end plate at right angles to said bridge with its stub shaft in axial alignment with the stub shaft on the other end plate.

6. The structure as in claim 5 wherein the perforated lugs and the spring are stamped out of the sheet metal bridge.

In testimony whereof, I affix my signature.

LEO GOLDHAMMER.